Figure 1:
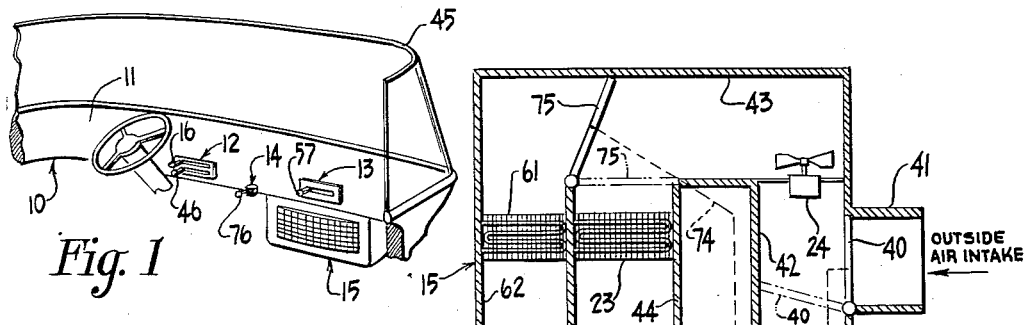

Dec. 27, 1960  F. R. WEYMOUTH, JR  2,966,032
HEATING AND VENTILATING SYSTEM FOR MOTOR VEHICLES
Filed July 17, 1958

INVENTOR.
FREDERICK R. WEYMOUTH JR.
BY
Bean Brooks Buckley & Bean
ATTORNEYS

United States Patent Office 2,966,032
Patented Dec. 27, 1960

2,966,032

HEATING AND VENTILATING SYSTEM FOR MOTOR VEHICLES

Frederick R. Weymouth, Jr., Buffalo, N.Y., assignor to Trico Products Corporation, Buffalo, N.Y.

Filed July 17, 1958, Ser. No. 749,173

12 Claims. (Cl. 60—97)

This invention relates to a system and components thereof for transmitting fluid pressure from a fluid pressure source to fluid pressure devices, and more particularly to a fluid pressure system for efficiently utilizing a fluid pressure source of a vehicle for actuating automotive accessories.

In the past, there has been a tendency to rely on flexible cables and mechanical linkages for actuating various accessories of an automotive vehicle. The use of such cables and linkages has proved relatively unsatisfactory because an undesirably large effort is often required to overcome the excessive friction thereof. However, an automotive vehicle does possess a source af vacuum, namely, the engine intake manifold, which can provide the necessary energy source for actuating fluid pressure motors which may operate automotive accessories, thereby eliminating the need for flexible cables and mechanical linkages and thereby obviating their shortcomings. Heretofore, there has been a problem in the use of pressure operated motors in a system where the motors are selectively actuable from a single fluid pressure source by the use of a plurality of control valves which are remotely positioned from each other. More specifically, when a fluid pressure device is deactuated, it is necesasry that the fluid pressure therein be vented so that the device may assume its normal deactuated position. If one of the valves controlling the device is vented, the fluid pressure source will become vented when the other valve attempts to cause the fluid pressure device to communicate with the fluid pressure source. It is, inter alia, with the solution to the foregoing problem in a simple and efficient manner that the present invention is concerned in order to permit fluid pressure motors, with the attendant advantages thereof, to supplant mechanical linkages and flexible cable attachments.

One object of the present invention is to provide a system in which a plurality of control valves, which are remotely positioned from each other, may individually actuate a fluid pressure device, such as a fluid pressure motor, from a single fluid pressure source. In order to accomplish this, necessary structure is provided for permitting any of the valves to actuate the fluid pressure motor when the other of the valves is in a venting position while at the same time preventing the fluid pressure source from being vented.

Another object of the present invention is to provide an arrangement whereby a plurality of fluid pressure devices, such as fluid pressure motors, may be actuated individually by suitable control valves without requiring a plurality of independent conduits communicating between a source of fluid pressure and each of the control valves. Other objects and attendant advantages of the present invention will readily be perceived hereafter.

Figure 2:
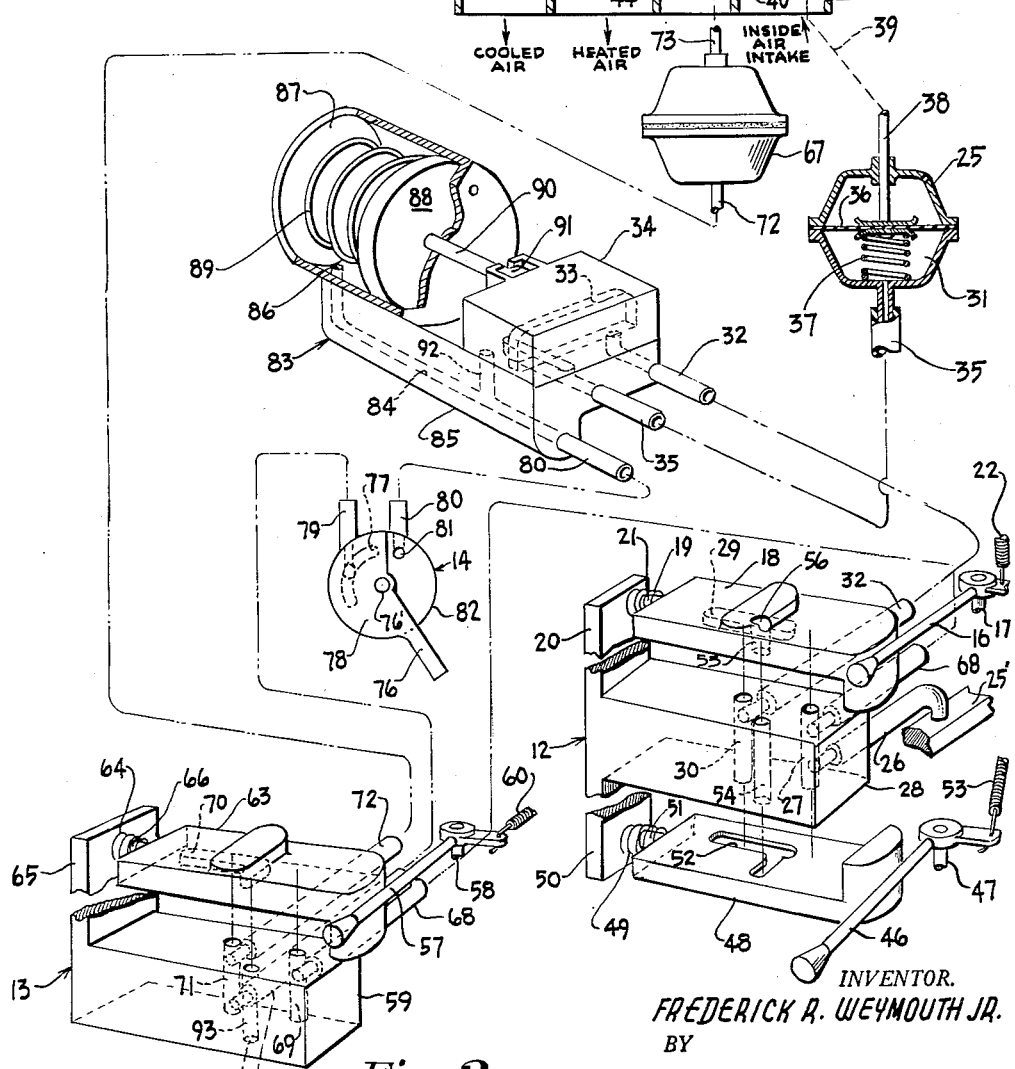

The present invention will be described in conjunction with a heating, defrosting, and air conditioning system for an automotive vehicle. However, it is to be understood that this invention has other applications in accordance with the above enumerated objects. The present invention will be more fully understood when the following portions of the specification are read in conjunction with the accompanying drawings wherein:

Fig. 1 is a fragmentary perspective view of a portion of an automotive vehicle with the control system of the present invention installed; and Fig. 2 is a view partly schematic, partly in cross section, and partly in perspective, of the control system and the various components thereof, certain of the portions in perspective being shown in exploded form in the interest of clarity.

In Fig. 1 a portion of an automotive vehicle 10 is shown having dashboard 11 on which are mounted a heating and defrosting selector valve or control 12, an air conditioning selector valve or control 13, and a control 14 for selectively causing outside air to be supplied to the vehicle during air conditioning. Portions of a heating and air conditioning unit are within casing 15 which is suitably mounted underneath dashboard 11 in any convenient manner.

When it is desired to actuate the heater for the automotive vehicle, control lever 16 (Figs. 1 and 2) is pivoted to the right about pivot pin 17 which may be fixedly mounted relative to selector valve or control 12 on the housing thereof (not shown) or on an extension (not shown) of valve body portion 28. Selector valve 12 is shown in exploded form in the interest of clarity. When this movement of lever 16 occurs, cable 22 which is affixed to lever 16, will cause a valve (not shown) to supply heated fluid to heat exchange coil 23 in casing 15 and also actuate a switch which causes fan 24 to operate. The movement of lever 16 to the right (in a counter-clockwise direction about pin 17) will also permit slider valve 18 to move to the right under the bias of spring 19 which is interposed between upstanding portion 20 of body portion 28 of valve 12 and a protuberance 21 which extends from the rear of slider valve 18. When slider valve 18 moves to the right, it will cause communication of fluid pressure motor 25 with a source of suction such as the engine intake manifold 25′ in the following manner: Conduit 26 has one end thereof coupled to a source of vacuum (manifold 25′) and the other end thereof communicating with conduit 27 which is within the body portion 28 of valve 12. After slider valve 18 has moved to the right, the depression 29 therein will cause communication between conduit 27 and conduit 30, which is also in body portion 28. Furthermore, conduit 30 will be in communication with chamber 31 of fluid pressure motor 25 through conduit 32, depression 33 in slider valve 34, and conduit 35. This will cause the flexible diaphragm 36 of fluid pressure motor 25 to be pulled downwardly against the bias of spring 37 because of the communication between motor chamber 31 and the source of vacuum. A shaft 38 is suitably attached to diaphragm 36 and will move along with diaphragm 36 when it is deflected. A suitable mechanical linkage, which is schematically depicted by dotted line 39, is coupled between shaft 38 and damper 40, which normally assumes the solid line position shown in the drawing when motor 25 is deactuated. Damper 40 serves the purpose of closing outside air duct 41 to prevent outside air from entering the passenger compartment of the vehicle when the heating coil 23 is not actuated in the above described manner. However, once heating fluid is supplied to heat exchange coil 23 as described above, fluid pressure motor 25 will cause damper 40 to assume its dotted line position to thereby permit fan 24 to supply fresh air through the heating coil 23 to the passenger compartment through conduits 42, 43 and 44.

In the event it is desired to defrost the windshield 45 of the vehicle when the heater is not in operation, it is merely necessary to move defrost lever 46 (Figs. 1 and 2) to the right in a counter-clockwise direction about pivot pin 47 which is fixedly mounted relative to valve 12 in any suitable manner, as described above relative to pin 17. This will permit slider valve 48 to move to the right because of the urge of spring 49 which is interposed between depending portion 50 of valve body 28 and protuberance 51 extending from the rear of slider valve 48. When this occurs depression 52 in slider valve 48 will cause communication between conduits 27 and 30 within the valve body 28 to thereby permit the circuit beyond conduit 30, as described above, to be completed to fluid pressure motor 25 to cause damper 40 to assume its dotted line position to supply fresh air to the vehicle. A flexible cable 53 which is affixed to lever 46 is coupled to a valve (not shown) for supplying heating fluid to heat exchange coil 23, for actuating fan 24, and for opening a damper (not shown) in the ductwork of the heater to route heated air to the windshield through suitable additional ductwork (not shown), as is well understood in the art. It will be appreciated, of course, that if lever 16 which controls the heater is already energized, the manipulation of lever 46 in a counter-clockwise direction, as described above, merely results in opening the appropriate ductwork for supplying heated air to the windshield.

When both levers 16 and 46 are in the position shown in the drawing so that slider valves 18 and 48 do not permit communication of the fluid pressure source with fluid pressure motor 25, chamber 31 of the fluid pressure motor is vented to the atmosphere through conduit 35, depression 33 in slider valve 34, conduit 32, conduit 30 in valve body 28, depression 52 in slider valve 48, conduit 54 in valve body 28, and conduit 55 in slider valve 18, conduit 55 having the end 56 thereof in communication with the atmosphere. It can readily be seen that if either slider valve 18 or 48 is actuated, there can be no venting of motor 25 in the above described path.

It will be appreciated, of course, as noted above, that selector valve 12 is shown in exploded form and that in actual assembled condition slider valves 18 and 48 have their lower and upper faces, respectively, in contact with the upper and lower faces, respectively, of body portion 28 to permit the above described communication between the various conduits to occur.

Whenever levers 16 and 46 associated with selector valve 12 are in the position shown in the drawing, fluid pressure motor 25 will assume the position also shown in the drawing to thereby cause damper 40 to close the outside air intake duct 41 to prevent cold air from entering the passenger compartment when hot fluid is not being supplied to heat exchange coil 23, as described above.

When it is desired to air condition the passenger compartment of the automobile, selector or control valve 13 (Figs. 1 and 2) has lever 57 thereof moved to the right in a counter-clockwise direction about pivot pin 58 which is fixedly mounted relative to body portion 59 of selector valve 13. A cable 60 which is attached to lever 58 causes fan 24 to be started and also causes a switch (not shown) to start the air conditioner (not shown), the evaporator or cooling coil 61 of which is located in air duct 62. After lever 57 has been moved in the counter-clockwise direction, slider valve 63 will be biased to the right by spring 64 which is interposed between upstanding portion 65 of body portion 59 and protuberance 66 which extends from slider valve 63. This action causes the vacuum source (manifold 25') to communicate with fluid pressure motor 67 (which has the same construction as fluid pressure motor 25) through conduit 26, conduit 27 in valve body 28, conduit 68 which is in communication with conduit 27, conduit 69 in valve body 59, depression 70 in slider valve 63, conduit 71 in valve body 59, and conduit 72 to complete the circuit. The supplying of vacuum to motor 67 will cause a flexible diaphragm therein (not shown) to cause shaft 73 to act through suitable mechanical linkage 74 to move damper 75 to the dotted line position shown in the drawing, thereby causing fan 24 to route the inside air from the passenger compartment of the vehicle through conduit 42, conduit 43 and conduit 62 back into the passenger compartment. It will be noted that when motor 67 is actuated damper 75 assumes its dotted line position wherein it prevents the flow of air through heating coil 23. It will also be noted that when damper 75 is in its solid line position (during heating or defrosting), it prevents air from bypassing heating coil 23. Furthermore, when selector valve 12 is deactuated, as it would be when the air conditioning control is manipulated, damper 40 will be in its solid line position to prevent a substantial amount of outside air from being mixed with the air from the passenger compartment which is being recirculated through the air conditioning system. This is desirable to prevent the air conditioning system from becoming overloaded by the passage of hot outside air over evaporator coil 61 when the air conditioner is in operation.

However, when the air conditioner is in operation during warm but not extremely hot weather, it is sometimes desirable to supply cooled fresh air to the passenger compartment rather than the recirculated air. In order to accomplish this, damper 40 should be opened when the air conditioner is in operation. To this end a fresh air control or valve 14 (Figs. 1 and 2) is provided for permitting outside air to be supplied for air conditioning. When lever 76 (Figs. 1 and 2) of valve 14 is moved in a clockwise direction about pivot pin 76', depression 77 in plate 78 will permit communication between conduit 79 (which is in communication with conduit 71 which is under vacuum when slider valve 63 has been moved to the right) and conduit 80 through port 81 in valve body 82.

When vacuum is supplied to conduit 80 it is also supplied to switch-over valve 83 to cause fluid pressure motor 25 to be actuated, notwithstanding that motor 25 was previously vented to the atmosphere when selector valve 12 was deactuated, as described above. As can be seen from the drawing, conduit 80 is in communication with conduit 84 in the body portion 85 of switch-over valve 83. End 86 of conduit 84 communicates with a chamber 87 having mounted therein a piston 88 which is biased to the right by spring 89. When vacuum is supplied to chamber 87, piston 88 will move to the left against the bias of spring 89. When this occurs slider valve 34 which is linked to piston 88 through connecting shaft 90 and coupling 91, will move to the left to enable depression 33 therein to cause communication between conduit 92 (which is in communication with conduit 84) and conduit 35 which is in communication with chamber 31 of motor 25. After the slider valve 34 has moved to the left, it will prevent communication of conduit 32 with depression 33 to thereby end venting of chamber 31 through the above described path. Furthermore, after slider valve 34 has moved fully to the left because of the action of piston 88, vacuum motor 25 will be caused to communicate with manifold 25' through conduit 35, depression 33 in slider valve 34, conduit 92, conduit 80, depression 77 in portion 78 of valve 14, conduit 79, conduit 71, depression 70 in slider valve 63, conduit 69 in valve body portion 59, conduit 68, conduit 27 in body portion 28 of selector valve 12, and conduit 26. As explaned above, the actuation of fluid pressure motor 25 will cause damper 40 to move to its dotted line position, therefore permitting outside air to be supplied through conduit 41 for air conditioning.

It will readily be appreciated that valves 12, 82, and 83, and the associated structure permit fluid pressure motor 25 to be actuated from a single source of vacuum through a plurality of valves which are remotely positioned from each other and which are so arranged that motor 25 may be vented to the atmosphere when both of the valves are not actuated but which is not vented to the atmosphere when either one or the other of the valves is actuated, thereby preventing the vacuum source from communicating with the atmosphere when one of the valves is in a vented position and the other valve is in an actuated position.

When the air conditioner is turned off by moving lever 57 in a clockwise direction to thereby move slider valve 63 to the left in Fig. 2, the above-mentioned path of communication between the vacuum source and fluid pressure motor 67 is broken. Motor 67 is then vented to the atmosphere through conduit 72, conduit 71 in valve body 59, depression 70 in slider valve 63, and conduit 93 (in valve body 59) which has the lower portion 94 thereof in communication with the atmosphere. Furthermore, after slider valve 63 has been moved to the left in Fig. 2, the vacuum in conduits 68 and 69 can no longer communicate with conduit 71 through depression 70. Therefore, chamber 87 of switch-over valve will no longer have vacuum therein and this chamber will communicate with the atmosphere through conduit 84, conduit 80, depression 77 (in the event that depression 77 is still in communication with port 81), conduit 79, conduit 71, depression 70, and conduit 93. When chamber 87 is vented to the atmosphere in the above described manner, spring 89 will cause piston 88 to move to the right and cause slider valve 34 to move to the right also, thereby causing depression 33 in slider valve 34 to communicate with conduit 32. This will permit the actuation of fluid pressure motor 25 when levers 16 or 46 associated with valve 12 are actuated. Furthermore, it can readily be seen that when the portion 78 of valve 14 is moved to the position shown in the drawing, chamber 87 of switch-over valve 83 will be vented to the atmosphere directly through conduits 84, 80, and port 81 to permit subsequent actuation of motor 25 by the manipulation of levers 16 or 46 associated with selector valve 12.

It will be appreciated that when fluid pressure motor 67 has been deactuated in the above described manner, lever 73 and associated linkage 74 will cause damper 75 to assume its full line position in Fig. 2 to permit the system to be prepared for subsequent heating or defrosting.

It will further be noted that selector valve 13 has conduit 69 therein always in communication with the vacuum source through conduit 68, conduit 27 in valve body 28, and conduit 26 which is in communication with the vacuum source 25'. Vacuum is supplied to selector valve 13 through the above circuit regardless of whether selector valve 12 has been actuated. This permits a single line such as 26 to be coupled to the vacuum source with a plurality of dependent valves operable from said source.

It can thus be seen that my invention is manifestly capable of achieving the objects and attendant advantages enumerated above, and while I have described my invention in conjunction with a heating, defrosting and air conditioning system for an automobile, I desire it to be be understood that it is not limited thereto but may be otherwise embodied within the scope of the following claims.

I claim:

1. A system for permitting actuation of a fluid pressure device by the selective manipulation of any of a plurality of valves associated therewith comprising a fluid pressure device, a fluid pressure source, first valve means operatively coupled between said fluid pressure device and said fluid pressure source, second valve means operatively coupled between said fluid pressure device and said fluid pressure source, and third valve means operatively associated with said first and second valve means for permitting either said first valve means or said second valve means to actuate said fluid pressure device independently of each other and for permitting proper venting of said device when both said first and second valve means are deactuated.

2. An arrangement for permitting the actuation of a fluid pressure device from a fluid pressure source comprising first means adapted to permit communication between said fluid pressure device and said fluid pressure source to thereby permit actuation of said fluid pressure device, second means adapted to permit communication between said fluid pressure device and said fluid pressure source to thereby permit actuation of said fluid pressure device, venting means for permitting said fluid pressure device to be deactuated when neither said first or second means cause said communication between said fluid pressure device and said fluid pressure source, and means operatively associated with both said first means and said second means for permitting either of said first or second means to actuate said fluid pressure device independently of each other while preventing venting of said fluid pressure device.

3. An arrangement for permitting actuation of a fluid pressure device from a fluid pressure source comprising a first selector valve operatively coupled between said fluid pressure device and said fluid pressure source, a second selector valve operatively coupled between said fluid pressure device and said fluid pressure source, venting means associated with both said first and second selector valves for permitting said fluid pressure device to be vented when both said first and second selector valves are deactuated, and third valve means for automatically permitting actuation of said fluid pressure device by either said first selector valve or said second selector valve while preventing venting of said fluid pressure device.

4. An arrangement for permitting the actuation of a fluid pressure device from a fluid pressure source comprising first valve means adapted to permit communication between said fluid pressure source and said fluid pressure device, first venting means operatively associated with said first valve means for permitting said fluid pressure device to be vented, second valve means adapted to permit communication between said fluid pressure source and said fluid pressure device, second venting means operatively associated with said second valve means for permitting said fluid pressure device to be vented, and third valve means operatively associated with both said first valve means and said second valve means for both permitting either of said first or second valve means to actuate said fluid pressure device and preventing venting of said fluid pressure device through the venting means associated with the other of said first or second valve means.

5. A system for permitting selective actuation of a plurality of fluid pressure devices either singly or in combination from a single fluid pressure source by selective utilization of a plurality of independent valves comprising a first fluid pressure device, a first selector valve, first conduit means in said first selector valve for permitting communication of said first fluid pressure device with said fluid pressure source, a second fluid pressure device, a second selector valve, second conduit means for permitting communication between said second selector valve and said fluid pressure source in all positions of said first selector valve, third conduit means in said second selector valve for permitting communication between said second conduit means and said second fluid pressure device, and valve means for permitting actuation of said first fluid pressure device when said second fluid pressure device is actuated notwithstanding that said first selector valve is not directly causing communication between said first fluid pressure device and said fluid pressure source.

6. An arrangement for permitting a plurality of valves to actuate a plurality of fluid pressure devices from a single fluid pressure source comprising a first fluid pressure device, a first selector valve, conduit means coupling said first selector valve to said fluid pressure source, first conduit means coupling said first selector valve to said fluid pressure device whereby said first selector valve may control the actuation of said first fluid pressure device by control of fluid from said fluid pressure source, a second fluid pressure device, a second selector valve adapted to control the actuation of said second fluid pressure device by control of fluid from said fluid pressure source, second conduit means for permitting communication of said second selector valve with said fluid pressure source whether or not said first selector valve is actuated, a third selector valve remotely positioned from said first selector valve and operatively coupled to said first fluid pressure device, venting means associated with both said first and third selector valves for permitting said first fluid pressure device to be vented when both said first and third selector valves are deactuated, and valve means operatively associated with both said first selector valve and said remotely positioned third selector valve for permitting actuation of said first fluid pressure device by either said first or third selector valves while preventing venting of said first fluid pressure device by the other of said first or third selector valves.

7. A valve arrangement comprising a body portion, first valve means operatively associated with said body portion for controlling the actuation of a fluid pressure device, second valve means operatively associated with said body portion for controlling the actuation of said fluid pressure device, and venting means operatively associated with both said first valve means and said second valve means for permitting said fluid pressure device to be vented when both said first and said second valve means are deactuated but preventing venting when either said first or second valve means are actuated.

8. A valve arrangement as set forth in claim 7 including conduit means for permitting said valve arrangement to act as a fluid pressure conduit for permitting communication between a fluid pressure source and a second fluid pressure device whether or not said first or second valve means are actuated.

9. A valve arrangement as set forth in claim 7 including control means operatively associated with at least one of said first or second valve means for causing a predetermined action when the valve means associated therewith are actuated.

10. In combination with a vehicle having a fluid pressure source therein, an arrangement for selectively actuating a fluid pressure device from said fluid pressure source comprising first means adapted to cause communication between said fluid pressure device and said fluid pressure source, second means adapted to cause communication between said fluid pressure device and said fluid pressure source, and third means operatively associated with both said first means and said second means for permitting either said first or second means to actuate said fluid pressure device while preventing venting of said fluid pressure device when the other of said first or second means are not actuated.

11. In combination with a vehicle having a fluid pressure source therein, an arrangement for permitting a plurality of valves to actuate a plurality of fluid pressure devices from a single fluid pressure source comprising a first fluid pressure device, a first selector valve, first conduit means coupling said first selector valve to said fluid pressure source whereby said first selector valve may control the actuation of said first fluid pressure device by control of fluid from said fluid pressure source, a second fluid pressure device, a second selector valve adapted to control the actuation of said second fluid pressure device by control of fluid from said fluid pressure source, second conduit means for permitting communication of said second selector valve with said fluid pressure source whether or not said first selector valve is actuated, a third selector valve remotely positioned from said first selector valve and operatively coupled to said first fluid pressure device, venting means associated with both said first and third selector valves for permitting said first fluid pressure device to be vented when both said first and third selector valves are deactuated, and valve means operatively associated with both said first selector valve and said remotely positioned third selector valve for permitting actuation of said first fluid pressure device by either said first or third selector valves while preventing venting of said first fluid pressure device by the other of said first or third selector valves.

12. A system for permitting the actuation of a fluid pressure device from a fluid pressure source comprising a first selector valve operatively coupled between said fluid pressure device and said fluid pressure source, a second selector valve remotely positioned from said first selector valve and operatively coupled between said fluid pressure device and said fluid pressure source, venting means associated with both said first and second selector valves for permitting said fluid pressure device to be vented when both said first and said second selector valves are deactuated, and third valve means for automatically permitting actuation of said fluid pressure device by operation of either said first selector valve or said remotely positioned second selector valve while preventing venting of said fluid pressure device by the other of said first or second selector valves.

References Cited in the file of this patent

UNITED STATES PATENTS

| | | |
|---|---|---|
| 2,247,141 | Twyman | June 24, 1941 |
| 2,586,932 | Gardiner et al. | Feb. 26, 1952 |
| 2,782,769 | Best | Feb. 26, 1957 |